US011600050B2

(12) United States Patent
Ponjou Tasse et al.

(10) Patent No.: US 11,600,050 B2
(45) Date of Patent: Mar. 7, 2023

(54) DETERMINING 6D POSE ESTIMATES FOR AUGMENTED REALITY (AR) SESSIONS

(71) Applicant: STREEM, LLC, Portland, OR (US)

(72) Inventors: Flora Ponjou Tasse, London (GB); Pavan K. Kamaraju, London (GB); Ghislain Fouodji Tasse, London (GB); Sean M. Adkinson, North Plains, OR (US)

(73) Assignee: STREEM, LLC, Portland, OR (US)

( * ) Notice: Subject to any disclaimer, the term of this patent is extended or adjusted under 35 U.S.C. 154(b) by 0 days.

(21) Appl. No.: 17/221,153

(22) Filed: Apr. 2, 2021

(65) Prior Publication Data

US 2022/0319120 A1 Oct. 6, 2022

(51) Int. Cl.
*G06T 19/00* (2011.01)
*G06T 7/70* (2017.01)
*G06F 3/04883* (2022.01)
*G06F 3/0346* (2013.01)

(52) U.S. Cl.
CPC .......... *G06T 19/006* (2013.01); *G06F 3/0346* (2013.01); *G06F 3/04883* (2013.01); *G06T 7/70* (2017.01); *G06T 2200/04* (2013.01); *G06T 2200/24* (2013.01); *G06T 2207/20081* (2013.01)

(58) Field of Classification Search
CPC .................................................. G06T 19/006
See application file for complete search history.

(56) References Cited

U.S. PATENT DOCUMENTS

| | | | | |
|---|---|---|---|---|
| 2009/0066690 | A1* | 3/2009 | Harrison | G06T 19/006 345/419 |
| 2012/0195461 | A1* | 8/2012 | Lawrence Ashok Inigo | G06T 19/006 382/103 |
| 2014/0085333 | A1* | 3/2014 | Pugazhendhi | G06F 3/011 345/633 |
| 2014/0267240 | A1* | 9/2014 | Smith | G16B 5/00 345/419 |

OTHER PUBLICATIONS

Tjaden, et al. "A Region-based Gauss-Newton Approach to Real-Time Monocular Multiple Object Tracking", Dec. 12, 2018, 16 pgs.

* cited by examiner

*Primary Examiner* — Charles Tseng
(74) *Attorney, Agent, or Firm* — Schwabe Williamson & Wyatt

(57) ABSTRACT

Embodiments include systems and methods for determining a 6D pose estimate associated with an image of a physical 3D object captured in a video stream. An initial 6D pose estimate is inferred and then further iteratively refined. The video stream may be frozen to allow the user to tap or touch a display to indicate a location of the user-input keypoints. The resulting 6D pose estimate is used to assist in replacing or superimposing the physical 3D object with digital or virtual content in an augmented reality (AR) frame.

19 Claims, 6 Drawing Sheets

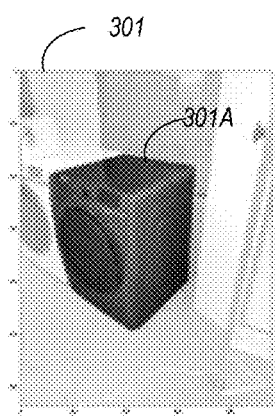
FIG. 3A
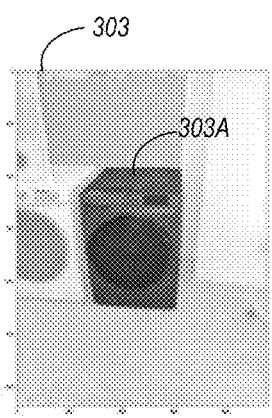
FIG. 3B
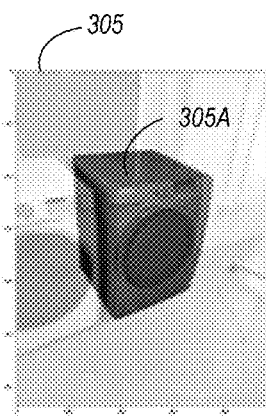
FIG. 3C
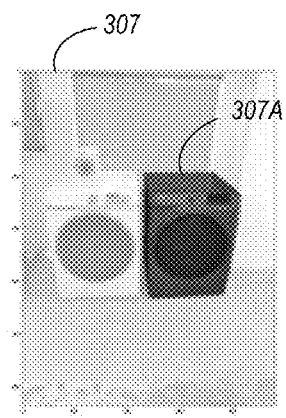
FIG. 3D
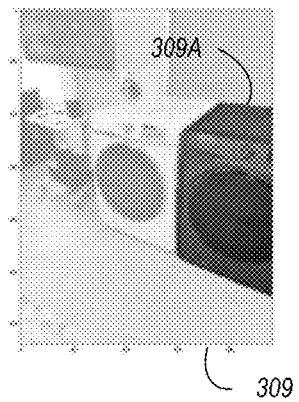
FIG. 3E
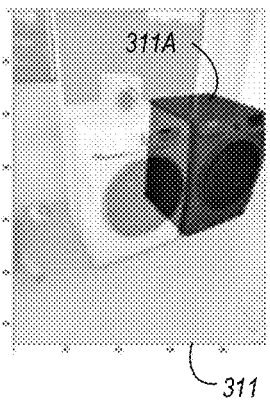
FIG. 3F
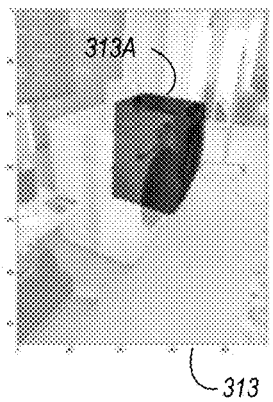
FIG. 3G
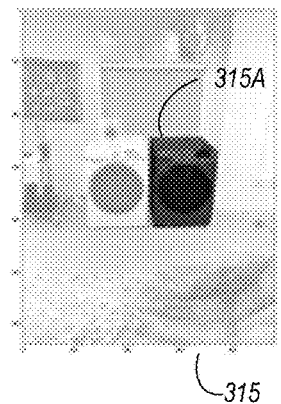
FIG. 3H
FIGS. 3A-3H

NON-TRANSITORY COMPUTER-READABLE STORAGE MEDIUM
602

PROGRAMMING INSTRUCTIONS 604,
CONFIGURED TO CAUSE A DEVICE, IN RESPONSE TO EXECUTION
OF THE PROGRAMMING INSTRUCTIONS, TO PRACTICE (ASPECTS
OF) EMBODIMENTS OF THE PROCESS(ES) DESCRIBED
THROUGHOUT THIS DISCLOSURE.

FIG. 6

DETERMINING 6D POSE ESTIMATES FOR AUGMENTED REALITY (AR) SESSIONS

TECHNICAL FIELD

The present disclosure relates to the field of augmented reality (AR), and specifically to determining 6D pose estimates of 3D objects.

BACKGROUND

Devices such as smartphones and tablets are increasingly capable of supporting augmented reality (AR). These devices may capture images and/or video and, depending upon the particulars of a given AR implementation, the captured images or video may be processed using various algorithms to detect features in the video, such as planes, surfaces, faces, and other recognizable shapes. An AR tutorial is one example of an AR implementation, in which the experience is focused around a given physical 3D object that may be replaced by digital or virtual content. Examples of AR tutorials may include but are not limited to, virtual try-on of apparel for humans, or a virtual training material around a motor engine.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

FIGS. 3A-3H illustrate video frames or augmented reality (AR) frames associated with a refinement of the initial 6D pose estimate of FIGS. 2A-2C, according to various embodiments.

FIG. 6 is a block diagram of a computer-readable storage medium that can be used to implement some of the components of the system or methods disclosed herein, according to various embodiments.

DETAILED DESCRIPTION OF DISCLOSED EMBODIMENTS

Figure 1:
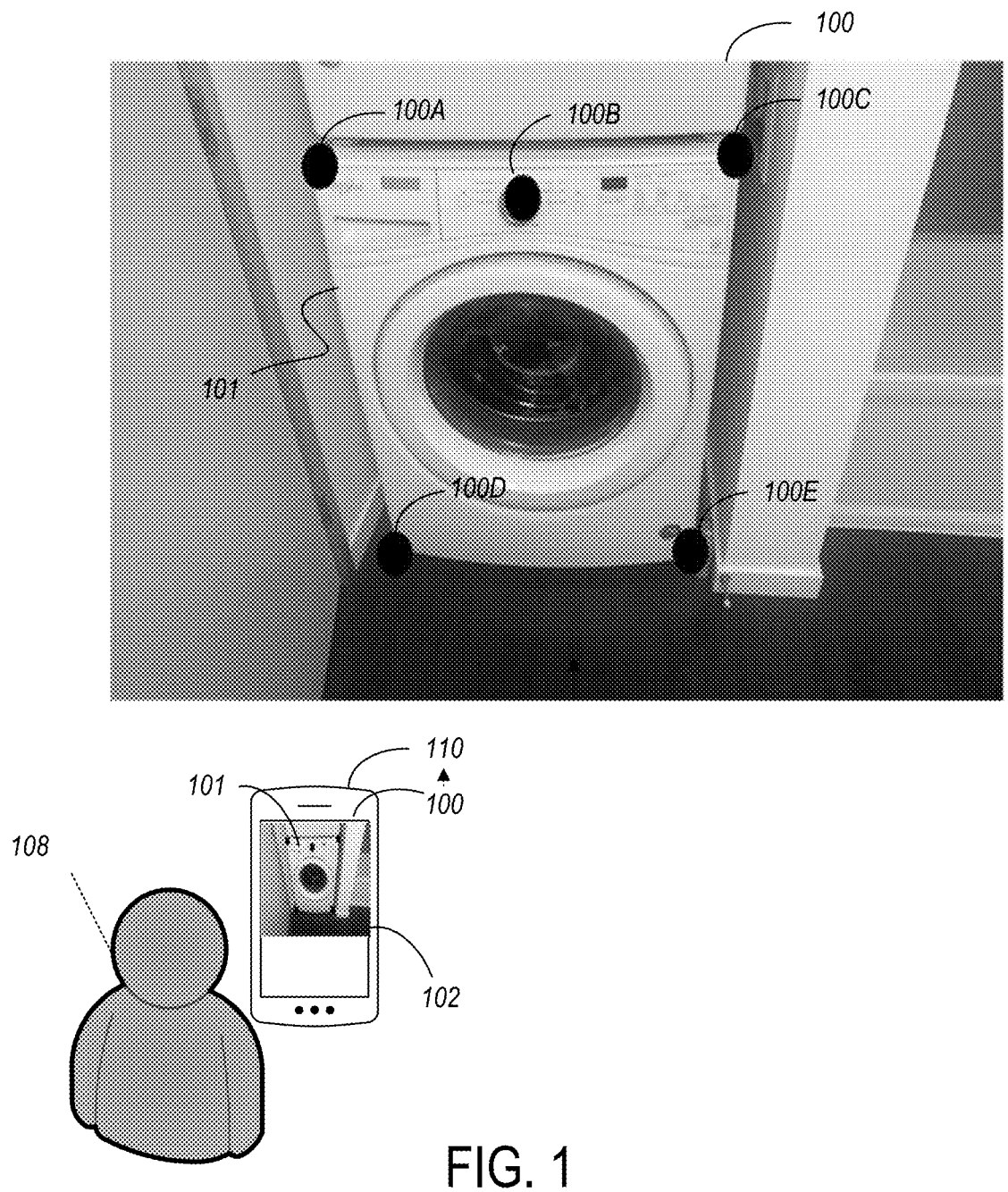
FIG. 1 is a block diagram illustrating input of user-input keypoints associated with determining a 6D pose estimate associated with a physical 3D-object, according to various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

An AR tutorial, also sometimes referred to herein as an Augmented Reality (AR) session, may include a video session focused upon a target 3D physical object that is replaced or superimposed with digital or virtual content such as, e.g., a 3D digital twin object. Some contexts may require the 6D-pose estimation of physical 3D objects. Note that 6D represents 6 degrees of freedom where objects in a 3D space move relative to 3 directional axes and 3 rotational axes. In an AR tutorial, the initial 6D coordinates of the virtual content may be determined from the 6D coordinates of a target 3D physical object. Current solutions focus on solving the 6D-pose estimation for small objects (e.g., objects that can be hand-held), however, methods for 6D-pose estimation of larger objects (and/or scaling to thousands of objects) can be overly complex.

Embodiments described below include methods for determining a 6D pose estimate (sometimes referred to as a 6D "object pose") used to place the digital or virtual content in an AR frame or scene. In embodiments, methods include receiving from a user, a location of keypoints (also, "user-input keypoints") of the physical 3D object according to an image in a video frame, wherein the user taps or touches a display of a mobile device to indicate a location of the user-input keypoints in an image of the video frame. In embodiments, the method further includes generating, using at least the location of the user-input keypoints, the 6D pose estimate for a digital twin 3D object to be placed in a similar location in the video frame or AR scene as the physical 3D object. Alternatively, the location of the keypoints in the image of the video frame could be automatically extracted using a machine learning model trained to estimate keypoints in images. Note that as will be described below, in embodiments, generating the 6D pose estimate includes determining an initial 6D pose estimate and then further refining the initial 6D pose estimate using a cost function and/or template matching based method. In embodiments, the cost function is further modified to more accurately provide 6D pose estimates for large objects.

FIG. 1 is a block diagram illustrating a user interaction associated with determining a 6D position and orientation ("pose") estimate associated with a physical 3D-object, according to embodiments of the disclosure. In embodiments, the user may select user-input keypoints, e.g., discrete keypoints, on an image of the physical 3D-object displayed on a mobile device 110. In the embodiment of FIG. 1, mobile device 110 held/operated by a user 108 captures a video stream including a physical 3D object e.g., washing machine 101, that is the subject of an AR tutorial. In embodiments, the video stream on a display 102 of mobile device 110 is frozen to display a video frame 100. In FIG. 1, video frame 100 is shown on mobile device 110 as well as enlarged/in greater detail above mobile device 110. In the embodiment, user 108 is prompted or guided via text or audible command to select on display 102, locations of specific types of keypoints. In embodiments, the specific types of keypoints have been predetermined for the particular 3D physical object and/or AR tutorial. For example, the keypoints for user input may include but are not limited to various anchor points or features such as, e.g., corners, control buttons or knobs, various planes and/or edges of the physical 3D object. In the embodiment, once user 108 taps or touches the user-input keypoints on the image, user-input keypoints 100A-100E appear as indicated by black dots in FIG. 1. Note that the black dots of input keypoints 100A-100E are merely illustrative and any suitable color, shape, or texture of indicators on display 102 to show where the user has selected input keypoints 100A-100E may be utilized. In some embodiments, user 108 may drag or otherwise adjust a location of input keypoints 100A-100E to overlay the proper anchor points or features. Note that the user may touch or tap display 102 with one or more fingers, stylus, or pen. In embodiments, the display can include any suitable touch screen, such as but not limited to including resistive, infrared, capacitive and SAW (surface acoustic wave) technologies that allows the user to interact directly with the image that is displayed.

Note that in the depicted embodiment of FIG. 1, mobile device 110 is a smartphone. Other embodiments may implement mobile device 110 as a variety of different possible devices, such as a tablet, two-in-one, hybrid, smart glasses, or any other computing device that includes or accepts a camera and provides necessary video and/or other positional information. Note that mobile device 110 further may include both a camera and a spatial position sensor, which provides information about the spatial position of the camera. It will be understood that the camera and a spatial position sensor may be contained within the body of mobile device 110. In embodiments, the camera is used to capture the surrounding environment of mobile device 110 and by extension, user 108. In other embodiments, mobile device 110 may be a camera that connects to an external computer, such as a laptop, desktop, or server.

Note that the camera may be any camera that can provide a suitable video stream for the intended purpose of mobile device 110. Where mobile device 110 is implemented as a smartphone or tablet, the camera may be one or more built-in cameras. In other embodiments, such as where mobile device 110 is a laptop, the camera may be built in or a separate, external unit. A suitable video stream may be a digital video stream, and may be compressed in embodiments with some form of video compression, such as AVC-HD, H.264, MPEG-2, or another suitable compression scheme. The camera may be configured to output standard or high-definition video, 4K video, or another resolution of video suitable for the intended purpose of the camera and mobile device 110. In other embodiments, such as where mobile device 110 is equipped with multiple cameras or similar sensors, one or more of the sensors may be configured to directly detect depth points, such as a 3D camera, LIDAR, or other suitable depth-sensing technology.

Figure 2C:
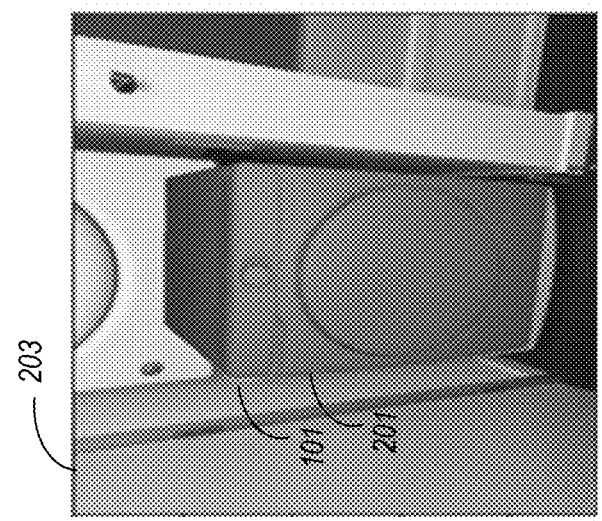
FIGS. 2A-2C are block diagrams illustrating video frames associated with determining an initial 6D pose estimate using the user-input keypoints of FIG. 1, according to various embodiments.
Figure 2B:
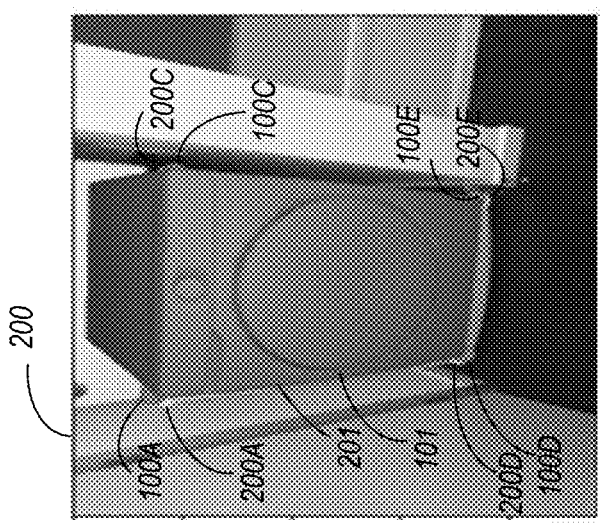
Figure 2A:
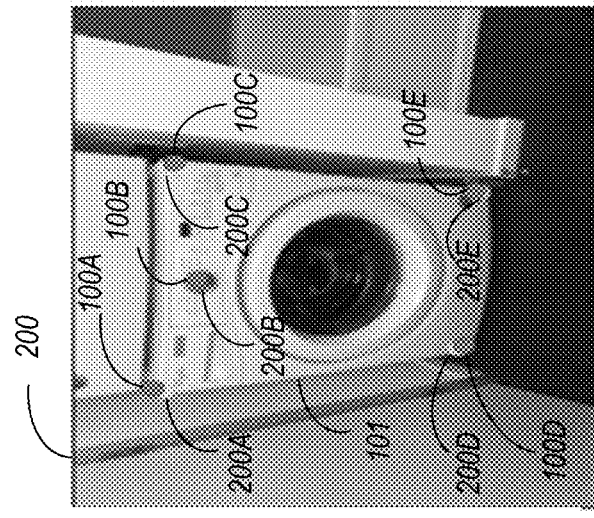

Referring now to FIGS. 2A-2C which are block diagrams illustrating video frames associated with determining an initial 6D pose estimate using the user-input keypoints of FIG. 1, in accordance with embodiments of the disclosure. FIG. 2A shows original user-input keypoints 100A-100E, located next to or near inferred keypoints 200A-200E for a 6D pose estimate for washing machine 101. Note that in FIGS. 2A and 2B, original user-input keypoints 100A-100E are illustrated with lighter shading to distinguish user-input keypoints 100A-100E from inferred keypoints 200A-200E. A 6D pose is computed using the 2D user-provided keypoints (original user-input keypoints 100A-100E) and the 3D keypoints of the known object that those 2D keypoints should be mapped to. The inferred keypoints 200A-200E are obtained by projecting the known 3D keypoints back to the screen using the inferred 6D pose. In embodiments, a 2D to 3D mapping solver uses keypoint or line alignment to perform the pose estimation. In embodiments, the 2D to 3D mapping solver may include any suitable perspective-and-point (PnP) algorithm.

In embodiments, the resulting initial pose estimate based on inferred keypoints 200A-200E is combined with image data from video frame 100 (the video frame at the time of user input) to infer the 6D pose estimate in a world (e.g., an AR API such as ARKit, discussed below) coordinate system. Accordingly, in FIG. 2B, in the embodiment, virtual content, e.g., a corresponding 3D digital twin object 201, is placed in an AR scene according to the pose estimate, as shown. FIG. 2C illustrates an image from a video frame 203 taken from a different camera viewpoint from that of FIGS. 2A and 2B. Video frame 200 includes placement of the corresponding virtual or digital content, e.g., 3D digital twin object 201, according to the inferred keypoints 200A-200E and resulting initial 6D pose estimate solved by a 2D to 3D mapper (e.g., PnP algorithm) based on original user-input keypoints 100A-100E.

Note that in embodiments, user-input keypoints such as, e.g., user-input keypoints 100A-100E, may be compiled into a training dataset that may be used for future automatic generation of 6D pose estimates. In embodiments, deep learning or other artificial intelligence (AI) methods may be used to automatically generate the initial 6D pose estimate without need for the user-input keypoints of FIG. 1.

FIGS. 3A-3H illustrate AR scenes or video frames that include virtual content that are associated with an additional refinement of data from, e.g., the 6D pose estimate determined with respect to FIGS. 2A-2C. Note that the initial 6D pose estimate associated with FIGS. 2A-2C was determined from user-input keypoints taken from only one viewpoint associated with video frame 100. Furthermore, the inferred keypoints associated with the pose estimate determined by the PnP algorithm may be susceptible to errors due to user input errors, specular surfaces, occlusion, and the like. In embodiments, refining the initial 6D pose estimate includes iteratively refining the initial 6D pose estimate until an estimated location of virtual or digital content, e.g., the 3D digital twin object, substantially converges with an actual location of the physical 3D object in one of more of a plurality of video frames. Example AR frames 301, 303,

305, 307, 309, 311, 313, and 315 include virtual content as seen from different video frames taken from different viewpoints due to the user moving, panning, and/or tilting the mobile device including the camera. FIGS. 3A, 3B, 3C, 3D, 3E, 3F, 3G, and 3H illustrate respective example AR frames 301, 303, 305, 307, 309, 311, 313, and 315 including respective virtual content, e.g., 3D digital twin objects 301A, 303A, 305A, 307A, 309A, 311A, 313A, and 315A that have been placed according to the refined initial 6D pose estimate.

In embodiments, iteratively refining the 6D pose estimate to arrive at placement of the 3D digital twin objects in FIGS. 3A, 3B, 3C, 3D, 3E, 3F, 3G, and 3H includes determining a cost function to determine an accuracy of the 6D pose estimate. In embodiments, a 6D pose estimate represented by a silhouette of the 3D physical object can be compared to an actual corresponding image from the same viewpoint (e.g., in an RGB or other video frame as captured in a video stream). The cost or error may be minimized until the silhouette substantially converges with the actual image in the video frame for a particular camera viewpoint. In some embodiments, the pose estimate is refined by applying the cost function such as, e.g., a region-based cost function that utilizes temporarily consistent local color histograms. A region-based cost function evaluates the cost of a 6D pose given a 3D model of the object and an image of the physical object. It may be based on how well the inferred 2D contour of the 3D model, using the given pose, segments the physical object in the image from its background. An example of a region-based cost function may include any suitable cost function, e.g., including a region-based Gauss-Newton approach to real-time monocular multiple object tracking. In embodiments, modifying the cost function includes analyzing a cosine similarity of vectors of the 6D pose estimate against the initial pose to determine an objective measure of how accurately the pose estimate is matching an actual image. In embodiments, template matching can be utilized to further improve the accuracy of error measurements. As noted above, although a region-based object tracking (RBOT) cost function may be preferable, the cost function can include any suitable algorithm that may be applied to 6D pose estimates which quantify the error between predicted values and expected values.

Further note that template matching refers to pre-computing offline as many silhouettes as possible (from many different random poses), such that given an image from a video frame, this image can be compared against pre-computed images. In some embodiments, the template matching may or may not be utilized during the iterative refinement based on memory required to store the pre-computed silhouettes.

Note that modifying the cost function by using the cosine similarity may be particularly applicable for pose estimates for relatively large items, such as e.g., washing machine 101 or other appliances.

Figure 4:
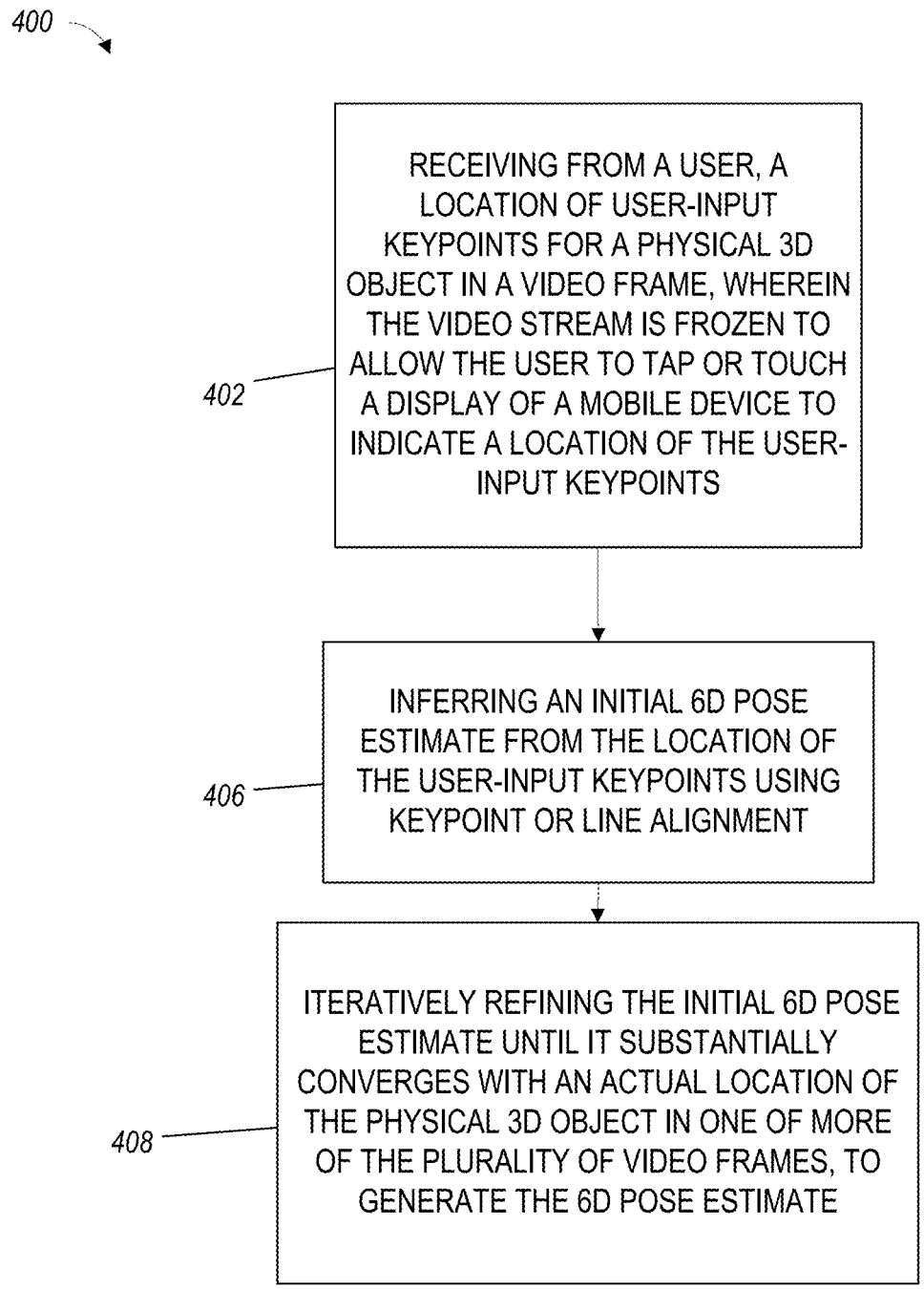
FIG. 4 is an example process flow for determining a 6D pose estimate associated with the physical 3D-object of FIG. 2, according to various embodiments.

FIG. 4 depicts an example process flow 400, for determining a 6D pose estimate, according to embodiments of the disclosure. At a beginning block 402, process 400 includes receiving from a user, e.g., user 108 of FIG. 1, a location of user-input keypoints on an image of a physical 3D object in a video frame, e.g., video frame 100 of FIG. 1. In the embodiment, the video stream is comprised of a plurality of video frames, each including image data and the video stream is frozen to allow the user to tap or touch a display of a mobile device to indicate a location of the user-input keypoints in an image of the video. Process 400 then includes generating, using at least the location of the user-input keypoints, the 6D pose estimate to assist in placing digital or virtual content in a similar location in the video frame (or other AR scene from a similar viewpoint as the video frame) as the physical 3D object. In the embodiment, generating the 6D pose estimate, includes at a next block 406, inferring an initial 6D pose estimate from the location of the user-input key points (as described in connection with FIG. 2). In embodiments, a perspective-and-pose (PnP) algorithm based on the user-input keypoints, is used to determine the initial 6D pose estimate.

At a next block 408, generating the 6D pose estimate further includes iteratively refining the initial 6D pose estimate until it substantially converges with an actual location of the physical 3D object in one of more of the plurality of video frames. As discussed in connection with FIG. 3 above, in some embodiments, iteratively refining the pose estimate for the physical 3D object includes determining a cost function to determine an accuracy of an initial 6D pose estimate. In some embodiments, the cost function is modified by analyzing a cosine similarity of vectors of the current 6D pose estimate to determine an objective measure of how accurately the pose estimate is matching an actual image.

In embodiments, the video stream is included in an Augmented Reality (AR) tutorial, where the digital or virtual content includes a digital twin 3D object to replace or superimpose the physical 3D object in a same or similar video frame. In embodiments, method 400 further comprises compiling a dataset including a plurality of the AR tutorials, where each AR tutorial is associated with a corresponding physical 3D object and includes user-input keypoints and/or the 6D pose estimates generated from the user-input keypoints. In embodiments, process 400 includes indexing and searching a repository of the plurality of AR tutorials to compile the dataset or to match a particular physical 3D object with a 6D pose estimate. Note that embodiments include training (and using) a machine learning (ML) model using the dataset for automatic generation of 6D pose estimate keypoints and/or 6D pose estimates for a similar physical 3D object. In embodiments, the dataset is used during an AR session to determine a correct AR tutorial/object, if the application supports more than one tutorial.

In various embodiments, process flow 400 may be performed in part or wholly by a computing device, including, e.g., a mobile devices such as a smartphone or a tablet, or a desktop, laptop or server, including a high-performance server computing device. For example, note that in some embodiments, a device, e.g., mobile device 110, that supports AR may provide an AR session on a device-local basis (e.g., not requiring communication with a remote system), such as allowing user 108 of mobile device 110 to capture a video using a camera built into mobile device 110, and superimposing AR objects upon the video as it is captured. Support for determining the initial 6D pose estimate as well as refining the initial 6D pose estimate may be provided by an operating system of mobile device 110, with the operating system providing an AR application programming interface (API). Examples of such APIs include Apple's ARKIT®, provided by iOS, and Google's ARCORE®, provided by Android. In other embodiments, a remote system may provide support or perform various aspects for the AR session by generating the 6D pose estimate and then providing the 6D pose estimate to the device for rendering of a 3D model including digital or virtual content.

Figure 5:
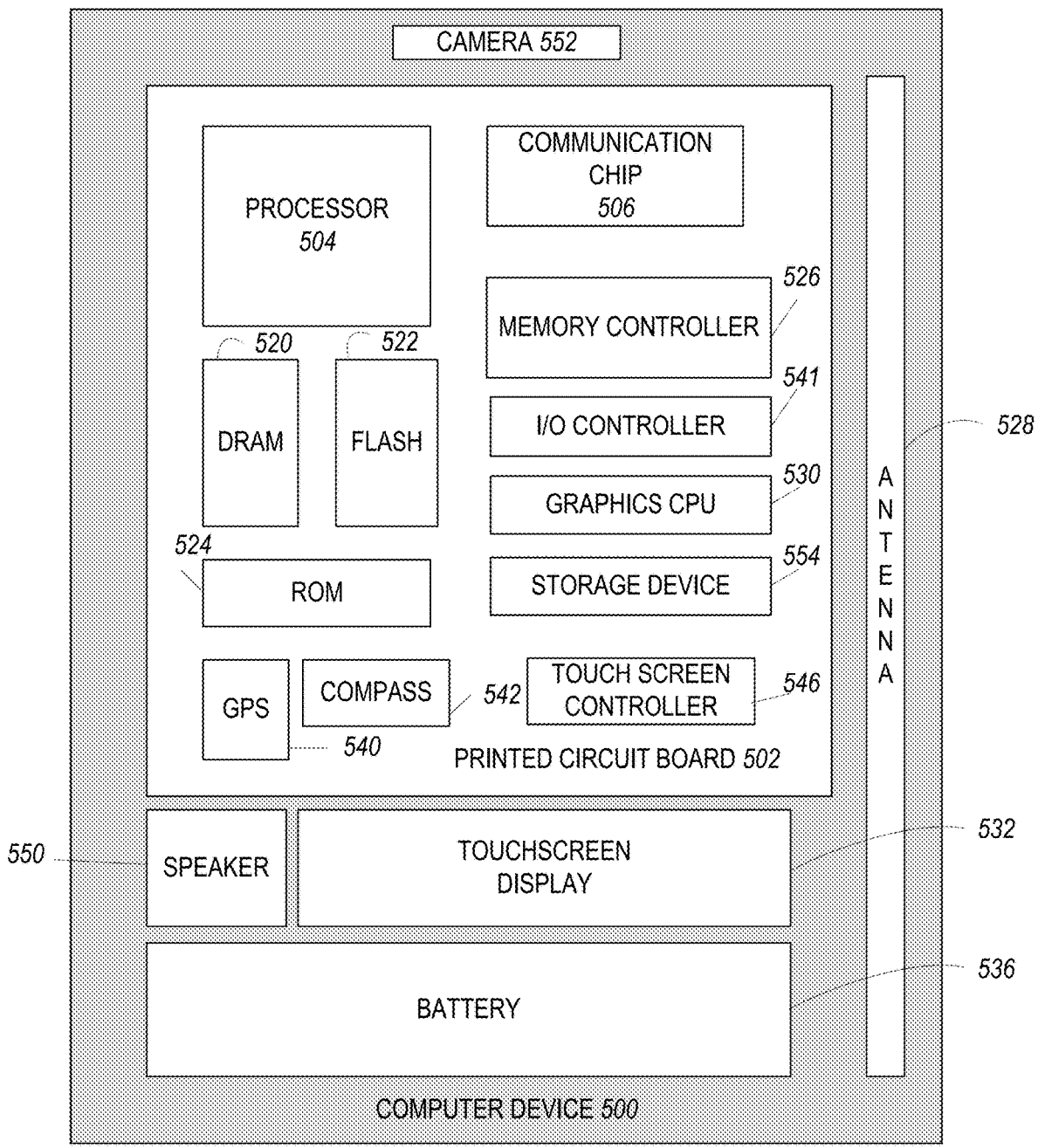
FIG. 5 is a block diagram of an example computer that can be used to implement some or all of the systems or methods described in FIGS. 1-4, according to various embodiments.

FIG. 5 illustrates an example computer device 500 that may be employed by the apparatuses and/or methods described herein, in accordance with various embodiments.

As shown, computer device 500 may include a number of components, such as one or more processor(s) 504 (one shown) and at least one communication chip 506. In various embodiments, the one or more processor(s) 504 each may include one or more processor cores. In various embodiments, the one or more processor(s) 504 may include hardware accelerators to complement the one or more processor cores. In various embodiments, the at least one communication chip 506 may be physically and electrically coupled to the one or more processor(s) 504. In further implementations, the communication chip 506 may be part of the one or more processor(s) 504. In various embodiments, computer device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computer device 500 may include other components that may be physically and electrically coupled to the PCB 502. These other components may include, but are not limited to, memory controller 526, volatile memory (e.g., dynamic random access memory (DRAM) 520), non-volatile memory such as read only memory (ROM) 524, flash memory 522, storage device 554 (e.g., a hard-disk drive (HDD)), an I/O controller 541, a digital signal processor (not shown), a crypto processor (not shown), a graphics processor 530, one or more antennae 528, a display, a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth.

In some embodiments, the one or more processor(s) 504, flash memory 522, and/or storage device 554 may include associated firmware (not shown) storing programming instructions configured to enable computer device 500, in response to execution of the programming instructions by one or more processor(s) 504, to practice all or selected aspects of process flow 400, described herein. In various embodiments, these aspects may additionally or alternatively be implemented using hardware separate from the one or more processor(s) 504, flash memory 522, or storage device 554.

The communication chips 506 may enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computer device 500 may be a laptop, a netbook, a notebook, an ultrabook, a smartphone (e.g., mobile device 110 of FIG. 1), a computer tablet, a personal digital assistant (PDA), a desktop computer, smart glasses, or a server. In further implementations, the computer device 500 may be any other electronic device that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computer 500, in response to execution of the programming instructions, to implement (aspects of) method associated with embodiments of the disclosure including, e.g., process flow 400. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. A method for determining a calculated six degrees of freedom (6D) pose estimate associated with an image of a physical three-dimensional (3D) object captured in a video stream, comprising:
   receiving, from a user, a location of user-input keypoints for the physical 3D object as displayed in a video frame of the video stream, wherein the video stream is frozen to allow the user to input the user-input keypoints;
   inferring an initial 6D pose estimate;
   obtaining inferred keypoints by projecting the user-input keypoints using the initial 6D pose estimate; and
   generating, using at least the location of the user-input keypoints and the inferred keypoints, the calculated 6D pose estimate to assist in replacing or superimposing the physical 3D object with digital or virtual content in an augmented reality (AR) frame.

2. The method of claim 1, wherein the user-input keypoints are discrete keypoints and generating the initial 6D pose estimate includes inferring the initial 6D pose estimate using keypoint or line alignment.

3. The method of claim 2, further comprising refining the initial 6D pose estimate, wherein refining the initial 6D pose estimate includes iteratively refining the initial 6D pose estimate until the initial 6D pose estimate substantially converges with an actual location of the physical 3D object in one or more of a plurality of video frames of the video stream.

4. The method of claim 1, wherein the video stream is included in an AR tutorial, wherein the digital or virtual content includes a digital twin 3D object to replace or superimpose the physical 3D object in the AR frame and the AR frame has a similar or same viewpoint as the video frame.

5. The method of claim 4, further comprising compiling a dataset including a plurality of AR tutorials, wherein each AR tutorial is associated with a corresponding physical 3D object and the dataset includes the user-input keypoints and/or a plurality of 6D pose estimates generated from the user-input keypoints.

6. The method of claim 5, further comprising training a machine learning (ML) model using the dataset and using the ML model to infer the plurality of 6D pose estimates for automatic generation of the plurality of 6D pose estimates.

7. The method of claim 5, further comprising indexing and searching a repository of the plurality of AR tutorials to compile the dataset.

8. The method of claim 1, wherein the user-input keypoints are received in response to a user prompt to select specific types of keypoints including, but not limited to, feature points such as top and bottom corners, left and right corners, control buttons, and edges or planes of the physical 3D object.

9. The method of claim 1, wherein the video stream is frozen to allow the user to input the user-input keypoints by tapping or touching a display of a mobile device to indicate the location of the user-input keypoints on the physical 3D object.

10. A non-transitory computer readable medium (CRM) comprising instructions that, when executed by an apparatus, cause the apparatus to determine a calculated six degrees of freedom (6D) pose estimate of a physical three-dimensional (3D) object captured in a video stream, wherein the instructions include to:

receive, from a user, a location of user-input keypoints for the physical 3D object in a video frame, wherein the video stream is comprised of a plurality of video frames each including image data and the video stream is frozen to allow the user to indicate the location of the user-input keypoints in an image of the video frame;

infer an initial 6D pose estimate;

obtain inferred keypoints by projecting the user-input keypoints using the initial 6D pose estimate; and generate, using at least the location of the user-input keypoints and the inferred keypoints, the calculated 6D pose estimate to assist in placing digital or virtual content in a similar location in the video frame as the physical 3D object.

11. The non-transitory CRM of claim 10, wherein the instructions to generate the initial 6D pose estimate includes instructions to infer the initial 6D pose estimate using a perspective-and-pose (PnP) algorithm based on the user-input keypoints.

12. The non-transitory CRM of claim 10, wherein the instructions to generate the calculated 6D pose estimate includes instructions to determine a cost function to determine an accuracy of the initial 6D pose estimate.

13. The non-transitory CRM of claim 10, wherein the instructions are to further cause the apparatus to compile a dataset including the user-input keypoints of the physical 3D object in the video frame to be used for future automatic generation of 6D pose estimate keypoints.

14. The non-transitory CRM of claim 10, wherein the instructions further include instructions to freeze the video stream on a display of a mobile device, to display the video frame to the user, and to prompt the user to tap or touch the display to indicate the location of the user-input keypoints on the image of the video frame of the physical 3D object.

15. An apparatus, comprising:

a memory; and a processor coupled to the memory to receive instructions from the memory to cause the apparatus to:

display a video frame of a video stream including an image of a physical three-dimensional (3D) object on a touchscreen of the apparatus;

prompt a user to input locations of a plurality of user-input keypoints of the physical 3D object on the touchscreen, wherein to input locations of the physical 3D object includes to input, by the user, the locations of the plurality of the user-input keypoints;

infer an initial six degrees of freedom (6D) pose estimate;

obtain inferred keypoints by projecting the user-input keypoints using the initial 6D pose estimate; and generate, using at least the locations of the plurality of the user-input keypoints and the inferred keypoints, a calculated 6D pose estimate to assist in placing digital or virtual content in a similar location in an augmented reality (AR) frame.

16. The apparatus of claim 15, wherein the apparatus is a smartphone or a tablet and the locations of the plurality of the user-input keypoints are input by a tap or a touch on a display of the smartphone or the tablet by the user.

17. The apparatus of claim 15, wherein the video stream is included in an AR tutorial, wherein the digital or virtual content includes a digital twin 3D object to replace or superimpose the physical 3D object in the AR frame according to the calculated 6D pose estimate.

18. The apparatus of claim 15, wherein the plurality of the user-input keypoints are discrete keypoints and generating the calculated 6D pose estimate includes initially estimating the initial 6D pose estimate using keypoint or line alignment.

19. The apparatus of claim 18, wherein the touchscreen is to display the plurality of the user-input keypoints as the user selects the plurality of the user-input keypoints.

* * * * *